March 31, 1970  L. R. POE  3,503,642
CONDITION INDICATOR FOR LATCHES
Filed March 18, 1968
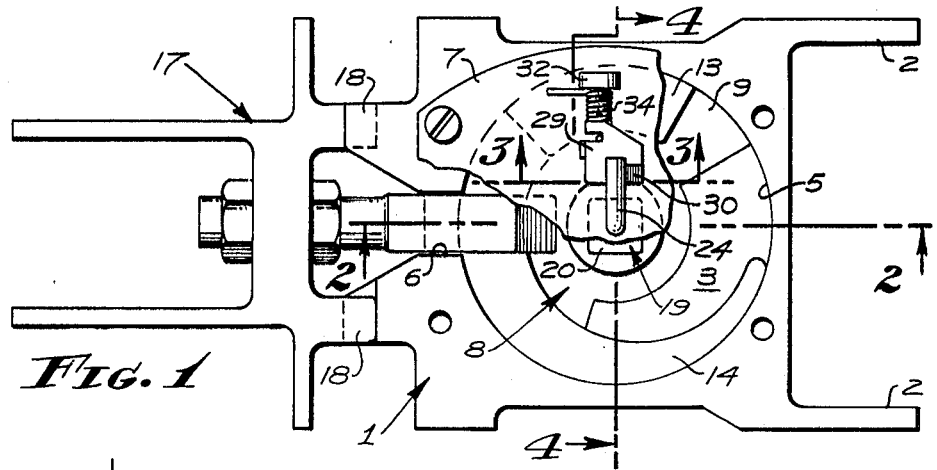
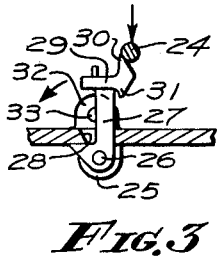
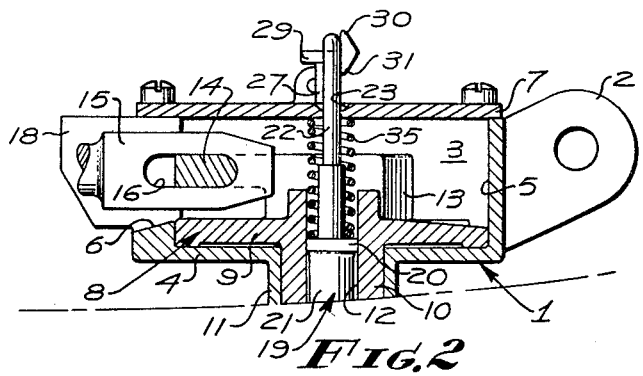
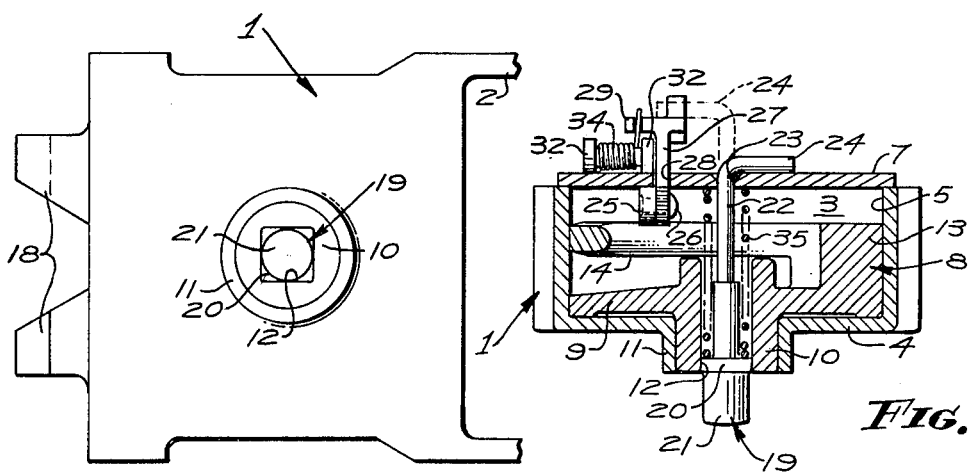
INVENTOR.
LLOYD RICHARD POE
BY Lyon & Lyon
ATTORNEYS

Header omitted

3,503,642
CONDITION INDICATOR FOR LATCHES
Lloyd Richard Poe, Los Angeles, Calif., assignor to Hartwell Corporation, Los Angeles, Calif., a corporation of California
Filed Mar. 18, 1968, Ser. No. 713,978
Int. Cl. E05c 19/10
U.S. Cl. 292—101      2 Claims

ABSTRACT OF THE DISCLOSURE

A condition indicator for latches having a tool receiving rotatable socket. The indicator is slidable in the socket and is spring urged to an extended position. A shaft having a side arm extends from the backside of the latch and engages a catch to hold the indicator flush with the entrance to the tool receiving socket. Insertion of the tool disengages the side arm from the catch, and rotation of the socket moves the side arm clear of the catch so that the indicator protrudes from the socket on removal of the tool. The catch is provided with a deflecting cam so that the side arm cannot re-engage the catch until the latch is fully in its secured condition.

SUMMARY OF THE INVENTION

The condition indicator is primarily adapted for incorporation with the type of mechanism disclosed in Patent No. 2,919,569, issued Jan. 5, 1960, to C. A. Davis, entitled Fastening Device Having a Rotatable Latch. The mechanism disclosed in this patent includes a rotatable latch having an arcuate finger which passes through an aperture in a locking bolt. The finger is joined to a tool receiving socket member centered on the axis of the finger. The latch mechanism disclosed in the above-mentioned patent is intended primarily for installation on aircraft in such a manner that the outer surface of the operating socket member is flush with the surface of the aircraft. The present invention is directed to an indicator fitted in the tool receiving socket and included in the objects of the invention are:

First, to provide a condition indicator which projects conspicuously from the latch mechanism if the bolt is not fully secure; that is, if the bolt is separated from the latch or has not been drawn tight, the indicator provides a clear visual signal.

Second, to provide a condition indicator from the backside of which extends a shaft having a side arm that engages a catch so located that it is not accessible to the side arm until the bolt is almost secured, and also includes a deflecting cam which moves the catch to one side of the side arm unless the bolt is fully secured.

Third, to provide a position indicator which does not interfere with the operation of the latch mechanism and is arranged to be disposed flush with the surface of the tool socket, when the mechanism is latched and the operating tool is removed, so as to avoid a recess in an otherwise flush surface when the latch mechanism is used on aircraft.

DESCRIPTION OF FIGURES

FIGURE 1 is a plan view of a latch for which the condition indicator is adapted, with portions of the cover plate removed to show underlying portions of the latch.

FIGURE 2 is a sectional view thereof, taken through 2—2 of FIGURE 1.

FIGURE 3 is a fragmentary, sectional view, taken through 3—3 of FIGURE 1, showing particularly the condition indicator when the latch has approached, but not quite reached, its secured position.

FIGURE 4 is a sectional view, taken through 4—4 of FIGURE 1, with the latch turned 180° from the position shown in FIGURE 1.

FIGURE 5 is a bottom view of the latch.

SPECIFICATION

The latch as shown in the previously mentioned patent and herein illustrated, is intended primarily for aircraft, and includes a housing 1, having mounting means 2 intended for attachment to adjacent portions of the aircraft frame or other structure. Formed in the housing 1 is a cylindrical chamber 3, having an end wall 4 and an encompassing side wall 5, which is interrupted by a bolt entrance slot 6. A cover plate 7 closes the chamber 3.

The cylindrical chamber receives a latch structure 8, which includes a base disk 9, having a boss 10, which is fitted within an outwardly extending journal sleeve 11 formed in the end wall 4. The boss 10 projects inwardly as well as outwardly with respect to the base disk 9, and is pierced by a tool socket 12 of polygonal cross section, preferably square in cross section.

Mounted on the base disk 9, within the cylindrical chamber 3, is a pedestal 13, which supports an arcuately curved latch finger 14, the outer surface of which conforms to the curvature of the side wall 5 of the chamber 3. The latch finger is tapered radially and is adapted to engage a bolt 15 when extended through the entrance slot 6, the bolt being provided with a keeper aperture 16.

The bolt 15 is suitably connected to a mounting fixture 17. In addition to mutual engagement between the latch finger 14 and the bolt 15, the housing 1 and the mounting fixture 17 are provided with mutually engageable bosses 18.

The structure so far described is essentially the same as that which is shown in the previously mentioned patent. The condition indicator, designated generally by 19, includes a polygonal slide 20, conforming to the cross section of the tool socket 12. Extending from the outer end of the slide 20 is an indicator head 21, which is preferably cylindrical to reduce the chance of its use when extended as a means for rotating the latch. The indicator head is painted or otherwise coated so as to be conspicuous when extended.

The inner end of the slide 20 is joined to a bar 22 of smaller diameter, which extends through the chamber 3 in coaxial relation therewith, and through a guide opening 23 provided in the cover plate 7. The end of the bar which protrudes from the cover 7 terminates in a laterally extending latch arm 24.

The underside or innerside of the cover plate adjacent the guide opening 23, is provided with a boss 25, which receives a pin 26, for the purpose of pivotally supporting a catch arm 27, which extends through an accommodation slot 28 provided in the cover plate 7. The protruding end of the catch arm terminates in a small keeper plate 29. At one corner, the keeper plate is provided with a small pointed projection extending away from the cover plate 7, and a similar pointed projection extending toward the cover plate. The projections form cams 30 and 31.

Mounted on the outerside of the cover plate 7 is a pair of bosses 32 between which extends a small shaft 33, on which is mounted a spring 34, one end of which bears against the cover plate 7, and the other end of which bears against the keeper plate 29, so as to urge the arm 27 against the one extremity of the slot 28.

A second spring 35 is interposed between the cover plate 7 and the slide 20, so as to urge the indicator head 21 outwardly from the boss 10.

Operation of the condition indicator is as follows:

When the latch finger 14 of the main latch has fully secured the bolt 15, as indicated in FIGURES 1 and 2, the latch arm 24 of the indicator rests on the keeper plate 29 adjacent the cam 30, so that the indicator head 21 is in intermediate position, with its outer end flush with the outer surface of the boss 10 and the journal sleeve 11. To disengage the latch structure, a tool, not shown, is inserted into the tool socket 12, depressing the indicator head 21 against the force of the spring 35. The tool is then used to rotate the latch finger 14 until the bolt 15 is disengaged. Inward depression of the indicator head 21 disengages the latch arm 24 from the cam 30 permitting rotation with the latch finger 14. When the tool is removed from the tool socket 12, the spring 35 urges the indicator head 21 to its extended position, as shown in FIGURE 4. Outward movement of the indicator head is limited by the engagement of the latch arm 24 with the surface of the cover plate 7.

When it is desired to secure the bolt 15, the tool is pressed against the outer end of the indicator head 21, forcing it into the socket so that the tool may engage the socket and rotate the latch finger 14. In doing so, the latch arm 24 is raised beyond the cam 30. When the bolt 15 is fully secured, and the tool is withdrawn from the tool socket, the latch arm 24 is received behind the cam 30, as indicated in FIGURES 1 and 2. Before the bolt 15 is in its secured position, even though close to the secured position, the latch arm 24 engages the cam 30, as indicated in FIGURE 3, deflecting the keeper plate 31 to one side, so that if the tool is withdrawn the indicator head will move to its extended position, indicating that the bolt 15 is not fully secured. When the tool is again inserted into the socket to cure this condition, the latch arm 24 engages the cam 31 to deflect the keeper plate 29 until the keeper arm is above the cam 30 so that the latch finger may be turned until the bolt 15 is fully secured.

While particular embodiments of this invention have been shown and described, it is not intended to limit the same to the details of the constructions set forth, but instead, the invention embraces such changes, modifications and equivalents of the various parts and their relationships.

I claim:

1. The combination with a latch including a housing, an arcuate latch finger rotatably mounted in the housing, between a secured position and a disengaged position, a socket of polygonal cross section journalled in the housing for rotating the latch finger and adapted to receive the polygonal end of a tool to effect rotation, of a condition indicator, comprising:
    (a) an indicator member received in said socket and including a polygonal portion whereby said indicator turns with said socket, and a readily visible head; said indicator being axially movable in said socket to move said head between a retracted position, an intermediate position in which the outer end of said head is flush with the outer end of said socket, and an extended, visible position;
    (b) a yieldable means urging said indicator toward its extended position;
    (c) an indicator latch extending rearwardly from said indicator member through said housing and terminating in a laterally directed latch element rotatable and axially movable with said indicator member;
    (d) and a keeper carried by said housing, positioned for engagement by said latch element, when said latch finger is in its secured position, to restrain said indicator head from outward movement beyond its intermediate position.

2. A condition indicator, as defined in claim 1, wherein:
    (a) said keeper is pivotally connected to said housing, and a cam carried by said keeper deflects said keeper from said latch element to permit movement of said indicator to its extended position should said latch finger be adjacent but not in its secured position.

References Cited

UNITED STATES PATENTS

| | | | |
|---|---|---|---|
| 2,193,349 | 3/1940 | Schlage | 70—432 X |
| 2,919,569 | 1/1960 | Davis | 70—97 |
| 3,125,876 | 3/1964 | Kuchler | 70—432 |
| 3,254,517 | 6/1966 | Wheeler | 70—97 |

RICHARD E. MOORE, Primary Examiner

EDWARD J. McCARTHY, Assistant Examiner

U.S. Cl. X.R.

70—432; 292—240